United States Patent [19]

Sato et al.

[11] Patent Number: 5,650,574
[45] Date of Patent: Jul. 22, 1997

[54] METHOD OF TIGHTENING A BOLT WITH AN OPTIMUM TIME

[75] Inventors: Satoshi Sato, Inagui; Makoto Tomita, Sapporo, both of Japan

[73] Assignee: Quantai Systems Inc., Mitaka, Japan

[21] Appl. No.: 671,553

[22] Filed: Jun. 27, 1996

[30] Foreign Application Priority Data

Jul. 11, 1995 [JP] Japan .................................. 7-197987

[51] Int. Cl.$^6$ ............................................. G01L 5/00
[52] U.S. Cl. ................................. 73/862.23; 73/862.21
[58] Field of Search ........................... 73/862.21, 862.23, 73/862.24

[56] References Cited

U.S. PATENT DOCUMENTS

| | | | |
|---|---|---|---|
| 4,987,669 | 1/1991 | Makimae et al. | 73/862.24 |
| 5,154,242 | 10/1992 | Soshin et al. | 73/862.23 |
| 5,315,501 | 5/1994 | Whitehouse | 73/862.23 |
| 5,563,482 | 10/1996 | Shaw et al. | 73/862.23 |

*Primary Examiner*—George M. Dombroske
*Assistant Examiner*—Ronald Biegel
*Attorney, Agent, or Firm*—Armstrong, Westerman, Hattori, McLeland & Naughton

[57] ABSTRACT

A method of tightening a bolt in an optimum time length does not require an additional program for controlling speed once optimum internal parameters have been determined through several learning cycles. A target torque is first preset and the nut runner is subjected to several learning cycles so that the nut runner automatically determines such internal parameters as to stop the motor immediately after the target torque is reached, requiring a minimum time for tightening the bolt.

2 Claims, 5 Drawing Sheets

$j=0,1,2,3,\ldots n$ $j=0,1,2,3,\ldots n$

| | TORQUE | SPEED |
|---|---|---|
| 0 | T(0)=0 | S(0)=0 |
| 1 | T(1) | S(1) |
| 2 | T(2) | S(2) |
| | . | . |
| j | T(j) | S(j) |
| | . | . |
| n | T(n)=T | S(n)=0 |

METHOD OF TIGHTENING A BOLT WITH AN OPTIMUM TIME

FIELD OF THE INVENTION

The present invention generally relates to a method of tightening a bolt or nut with a predetermined maximum torque by the use of a nut runner.

PRIOR ART

In tightening a bolt by the use of a nut runner, overtightening results if the speed of the runner is set to zero when the torque has reached a predetermined value. This is due to the inertia of the motor and to time delay before the speed command reaches the motor.

In order to prevent the excess torque from being applied to the bolt, the speed of the motor should be as close to zero as possible just before the torque applied to the bolt reaches a target value. However, decreased speeds result in increased time required for tightening the bolt and therefore decreasing speed is not practical. Setting the speed close to zero can cause the motor to stop before the torque reaches the target value if the friction is relatively large.

Conventionally, taking the past data and experiences into account, the programmer writes a control program that controllably drives the nut runner stepwise.

Writing a control program requires considerable experience and skill. Most of the users cannot write such a program and an experienced programmer must spend considerable amount of time in writing the control program.

SUMMARY OF THE INVENTION

The present invention is made in view of the aforementioned problems. An object of the invention is to provide a method of tightening a bolt in an optimum time length. Such method does not require an additional program for controlling speed once optimum internal parameters have been determined through several learning cycles.

In the present invention, a target torque is first preset and the nut runner undergoes several learning cycles so that the nut runner automatically determines such internal parameters so as to stop the motor immediately after the target torque is reached, thereby requiring a minimum amount of time for tightening the bolt.

BRIEF DESCRIPTION OF THE INVENTION

Features and other objects of the invention will become more apparent from the description of the preferred embodiments with reference to the accompanying drawings in which.

DETAILED DESCRIPTION OF THE PREFERRED EMBODIMENTS

The principle of an apparatus for tightening a bolt with an optimum time length according to the present invention will be described in detail. Kinetic energy of a rotating body is generally given by $$F = I\frac{dx}{dt} + Dx \qquad (1)$$

where F is an input (target speed), I is a moment of inertia, D is a decaying constant, x is an angular velocity, and t is time.

Equation (1) implies that after the target speed F is changed stepwise, the operating condition of the nut runner is determined by the variables I, D and x, x being an angular velocity immediately after the target speed F is changed. The torque is proportional to the integration of x with respect to time after the nut runner has reached the work to be fastened by the bolt, i.e., after torque is generated.

If the nut runner is operated so that the nut runner runs slowly until the bolt head reaches the work and input speed F is set infinitely close to Dx after the work is reached, then the torque applied to the work slowly approaches the target torque. If the input speed F is set to zero when the target torque is reached, no overshoot results but there will be a very long time before the tightening is completed. In contrast, if the input speed F is set to a large value so that the target torque is reached in the input speed F is set to zero as soon as the target torque is reached, then the nut runner operates according to Equation 2;

$$0 = I\frac{dx}{dt} + Dx \qquad (2)$$

with an overshoot given by Equation 3, $$\int \omega\, dt \qquad (3)$$

the overshoot existing till x=0.

Figure 3:
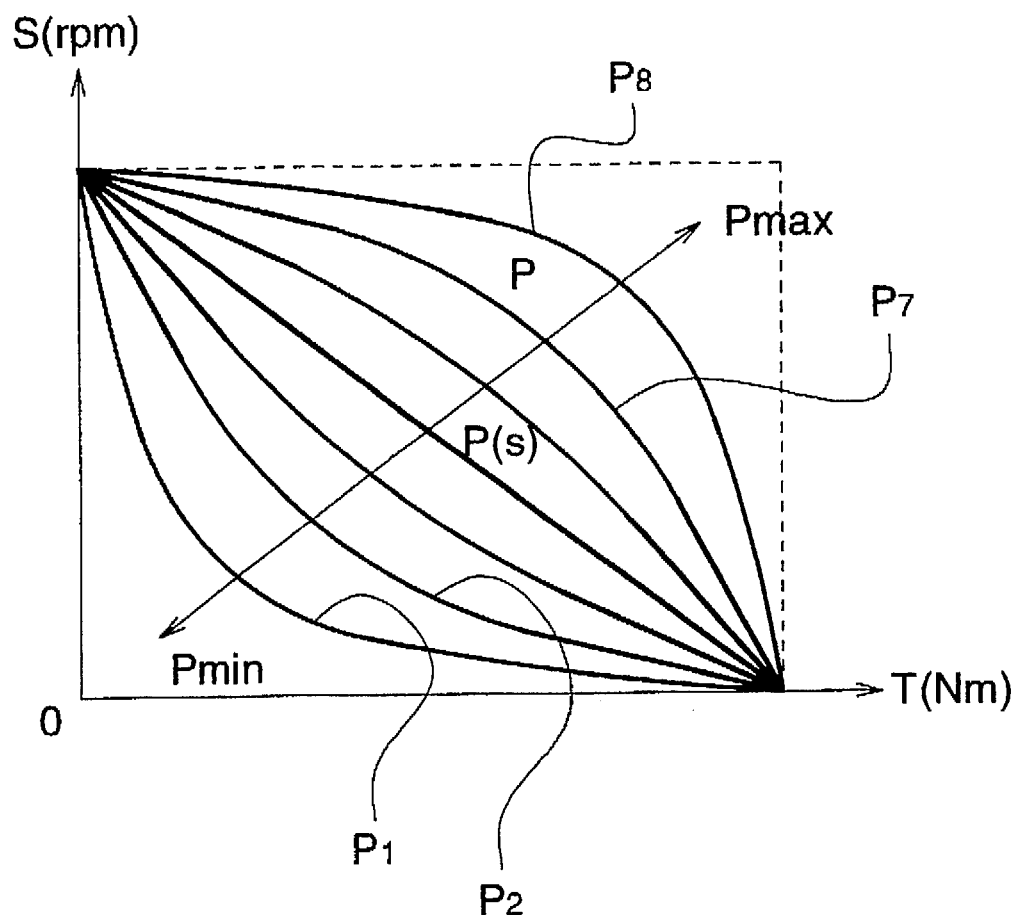
FIG. 3 shows sample curves of torque T versus rotational speed S.

FIG. 3 shows sample curves of torque T versus rotational speed S, rotational speed S being plotted in the vertical axis and torque T in the coordinate. It is assumed that the rotational speed S is a maximum value when the torque is zero, and the input speed F is set to zero when torque reaches the target torque. Operating the motor in accordance with Curve 8 allows tightening of the nut at a minimum period of time. If the motor fails to follow the Curve P8, then there will be an overshoot.

Figure 1:
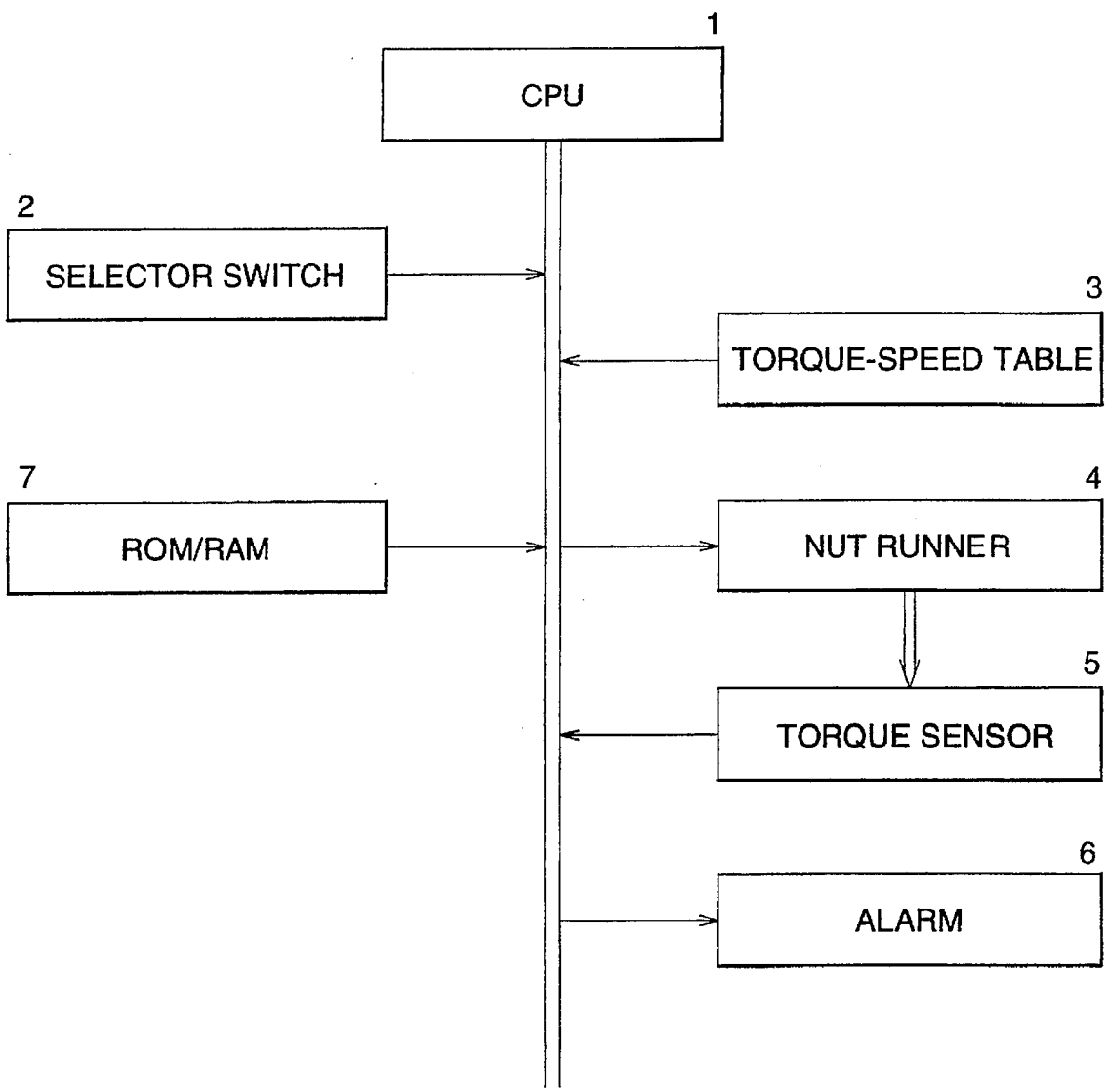
FIG. 1 is a block diagram of a constant torque bolt-tightening apparatus of the invention.
Figure 2:
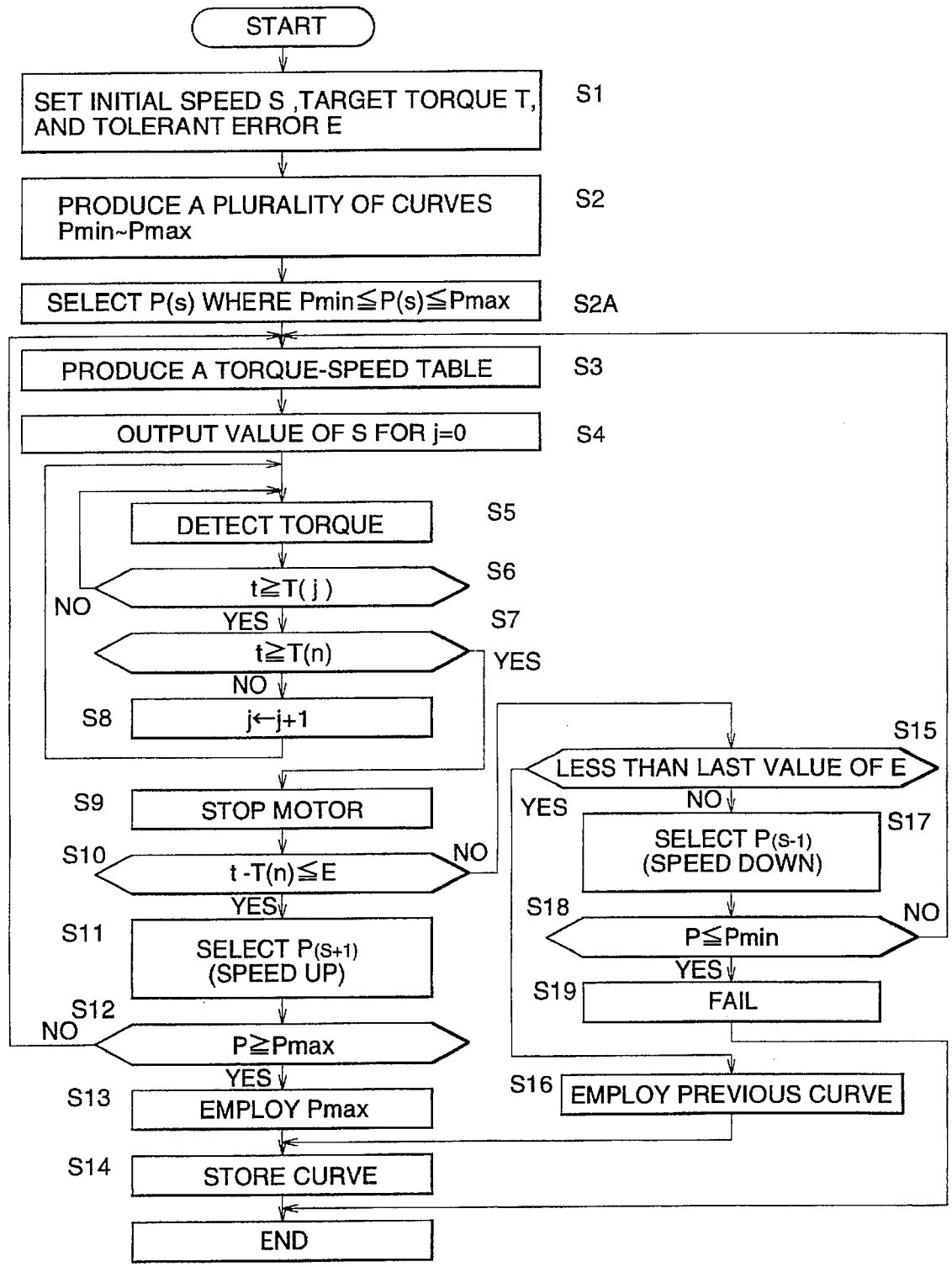
FIG. 2 is a flowchart showing the operation of the apparatus in FIG. 1.

An embodiment of the present invention will now be described with reference to FIGS. 1 and 2. FIG. 1 is a block diagram of a constant torque bolt-tightening apparatus and FIG. 2 is a flowchart showing the operation of the apparatus. Reference numeral 1 denotes a CPU. A selector switch 2 is used to select one of the curves in FIG. 3 along which the bolt-tightening apparatus undergoes learning cycles. A memory 3 stores the table shown in FIG. 5 therein which shows the normalized values of the rotational speed and torque in FIG. 3. A torque sensor 5 is incorporated in a nut runner 4. Reference numeral 6 denotes an alarm.

At step S1, the switch 2 is operated to set an initial value of the rotational speed S based on the characteristics of the nut runner 4, target torque, and tolerant error E. At step S2, a plurality of curves are produced on the basis of the rotational speed S, target torque, and tolerable error E. At step S2A, Curve P(s) is arbitrarily selected, P(s) being in the relation of Pmin≦P(s)≦Pmax and s being 1, 2, 3, . . . , 8. Curve P(s) may be a curve used in the past. The CPU 1 reads values of T(0) and S(0) for j=0 from Curve P(s) and the value of target torque T(n) for j=n.

FIG. 3 shows curves representing relationships between speed and torque for different parameters, thereby, representing a required speed for a given torque.

Figure 4A:
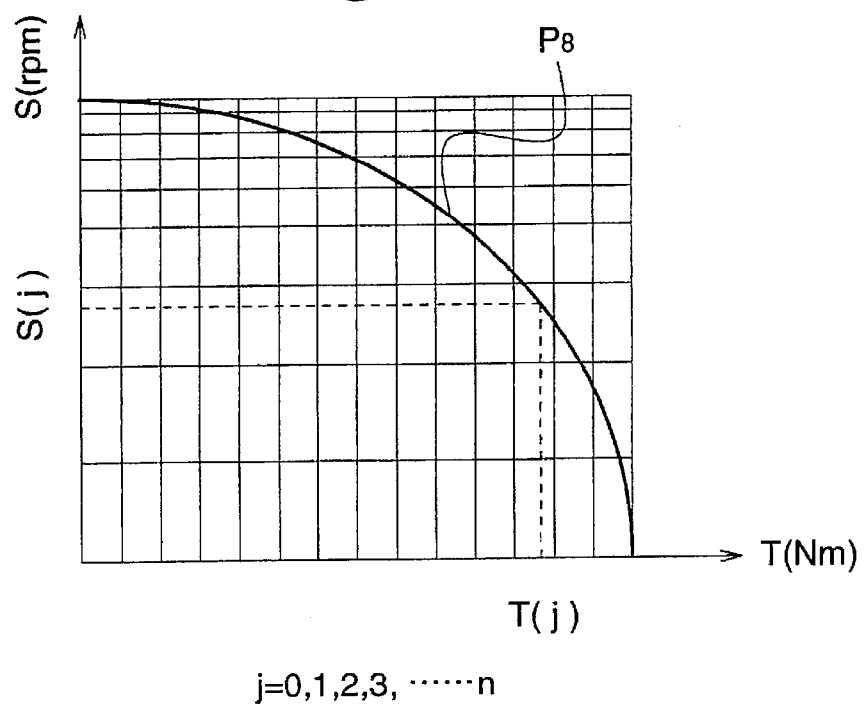
FIG. 4A shows Curve P8 of FIG. 3
Figure 4B:
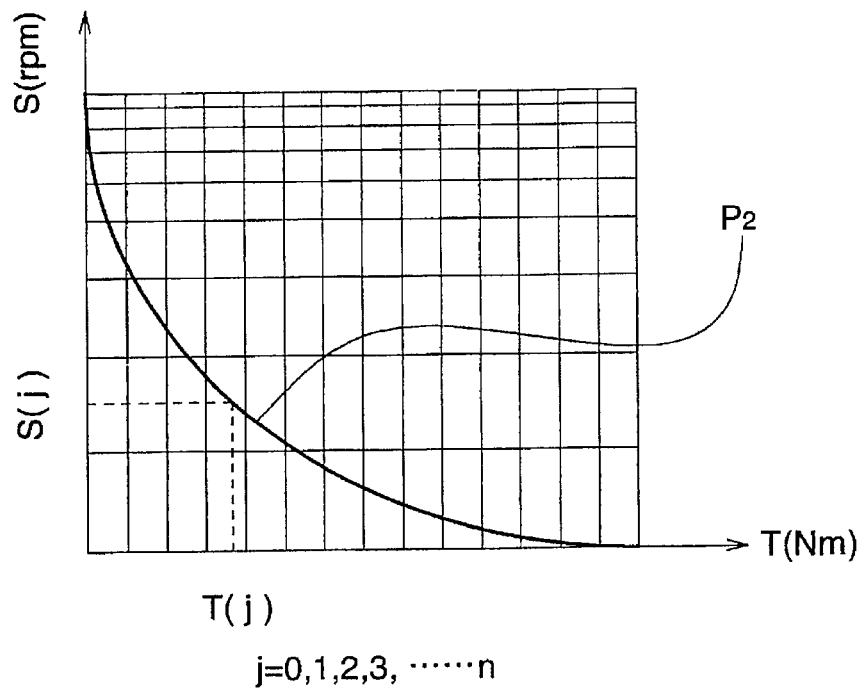
FIG. 4B shows Curve P2 of FIG. 3.

FIG. 4A shows Curve P8 of FIG. 3 and FIG. 4B shows Curve P2, the curves P2 and P8 being shown in semi-log scale. Each curve represents a value S(j) of rotational speed S corresponding to a given value T(j) of torque T, where j=1, 2, 3, ..., n. A larger value of n enables more precise control.

Figures 5, 6:
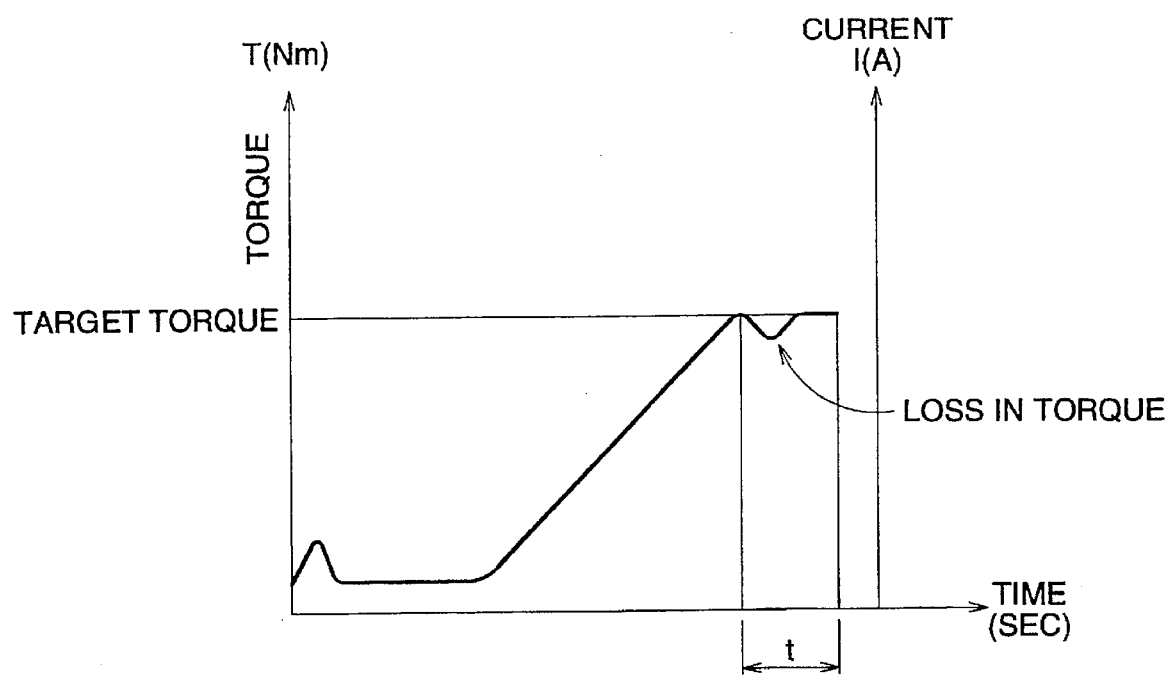
FIG. 5 shows a torque/speed table produced in accordance with Curve P(s) shown in FIG. 3.
FIG. 6 illustrates the changes in torque, showing loss in torque after the target torque is reached.

At step S3, a torque/speed table as shown in FIG. 5 is produced in accordance with Curve P(s) shown in FIG. 3, and proceeds to step S4 where the tightening operation is started.

Upon starting the tightening operation, the CPU 1 monitors the value of torque t by means of the torque sensor 5 incorporated in the nut runner 4. At step S6, the CPU 1 determines whether the torque t is equal to or greater than T(j). If the answer at step S6 is YES, then the program proceeds to Step S7 where a check is made to determine whether the torque T is equal to or greater than the target torque T.

If the answer at step S7, then the value of j is incremented by 1 at step S8 and the program returns to step S5. Steps S5-S8 are repeated until the torque reaches or exceeds the target value T(n). When the answer at step S7 is YES, then the program proceeds to step S9 where the motor is stopped.

At step S10, a logical test is made to determine whether a difference between the final detected torque t and the target torque T(n) is equal to or less than the tolerable error E. If the difference is greater than the tolerable error E, the program proceeds to step S15 where a logic test is made to determine whether the difference is less than the error resulted from the previously chosen curve. If the answer at step S10 is YES, then Curve P(s+1) is selected at step S11. A check is made to determine whether Curve P(s+1) is actually Pmax or a higher curve. If the answer is No at step S12, then the control proceeds to step S3 to repeat steps S3-S12 till Curve P(s+1) is actually Curve Pmax or a higher curve.

If the answer at step S12 is YES, then Curve Pmax is stored at step S14 and the learning cycle completes.

If the answer at step S15 is YES, the control jumps to S16 where the previously tested Curve is finally employed and stored at step S14.

If the answer at step S15 is NO, then Curve P(s-1) is selected at step S17 and the control proceeds to step S18 where a check is made to determine whether the curve is actually Curve Pmin or a lower curve. If the answer at step S18 is No, then the control jumps to S3 and steps S3-S10 and S15-S18 are carried out till the curve is actually Pmin or a lower curve. If the answer at step S18 is YES, then tightening operation failed and the control carries out the alarm operation. If the answer is YES at step S15, the program jumps to step S16.

In tightening the bolt in accordance with the optimum curve determined through the aforementioned learning cycle, insufficient tightening results as shown in FIG. 6 due to a loss in torque which occurs shortly after the target torque is reached. This is due to the fact that the work is squeezed and brought into intimate contact with the bolt or nut. Therefore, in the present invention, the output torque with the nut runner still attached to the work is used to provide additional rotations to compensate for the loss in torque.

That is, the motor current is allowed to continue to flow for a short time period 1 after the target torque is reached. This prevents the torque of the bolt from decreasing, thereby, ensuring that the bolt is tightened with the target torque.

While the invention has been particularly shown and described in reference to preferred embodiments thereof, it will be understood by those skilled in the art that changes in form and details may be made therein without departing from the spirit and scope of the invention.

What is claimed is:

1. A method of tightening a bolt in an optimum time, comprising the steps of:

setting at least an initial speed of a motor, a target torque, and a tolerable error of a final torque relative to the target torque;

producing a plurality of curves of rotational speed versus torque on the basis of the initial speed, target torque, and tolerable error;

selecting an arbitrary curve from a predetermined plurality of curves of rotational speed versus torque;

operating a motor at speeds obtained from the selected curve; monitoring produced torques while the motor is being operated;

determining a final curve on which the target torque is reached at a minimum time; and performing a bolt-tightening operation using said curve on which the target torque is reached.

2. The method according to claim 1 further including the step of:

allowing a current though the motor to continue to flow for a predetermined time length subsequently after said target is reached, said current being of a value at which said target torque is reached, thereby compensating for a loss in torque.

* * * * *